UNITED STATES PATENT OFFICE.

DOMINIQUE E. COUTARET, OF NEW YORK, N. Y.

IMPROVED MODE OF DISINFECTING BONE-BOILING ESTABLISHMENTS.

Specification forming part of Letters Patent No. 57,093, dated August 14, 1866.

*To all whom it may concern:*

Be it known that I, DOMINIQUE E. COUTARET, of New York city, in the State of New York, have invented a new and Improved Disinfecting Process for Preventing Bone-Boiling and Fat-Melting Establishments from Infection; and I do hereby declare that the following is a full and exact description thereof.

The nature of my invention consists in immersing animal matters—such as bones, flesh, or fat—into a disinfecting-liquid, and to boil them by operating a chemical reaction, which destroys all deleterious emanations during the ebullition of the bones and the fusion of the fat.

To enable others skilled in the art to make and use my invention, I will proceed to describe its preparation and operation.

I first prepare a solution of the salt known in chemistry as "hyposulphite of soda," marking 4° of Baumé's aerometer. I dip in this liquid the bones, flesh, or fat, and let them soak during ten or twelve hours. I then take them from the liquid and put them into a wooden vat lined with lead. I add a sufficient quantity of clear water to enable them to boil by means of a jet of steam.

Before the ebullition takes place I pour into the vat sulphuric acid in the proportion of one per cent. of the animal matters which the vat contains. The reaction of the sulphuric acid operates during the ebullition by decomposing the hyposulphite of soda with which the animal matters are impregnated. Sulphurous acid is then disengaged, which destroys the compounds of sulphur and phosphorus with hydrogen, and prevent their being again evolved. It acts as a deodorizer by removing smells already formed. It also performs the part of an antiseptic or antiputrescent, and impedes fermentation.

During this chemical reaction sulphate of soda is formed, which remains dissolved in the water without any inconvenience to the bones or fat, which acquire, on the contrary, greater whiteness and better quality.

After six to eight hours' ebullition I separate the fat from the liquid and the residue, which are disinfected without any return of ulterior fermentation.

What I claim as my invention, and desire to secure by Letters Patent, is—

The disinfection of bone-boiling and fat-melting establishments by means of chemical process and reagents, or any others substantially the same, and which will produce the intended effect, as described.

New York, January 18, 1866.

D. E. COUTARET, M. D.

Witnesses:
AARON STONE,
JAS. L. ANTHONY.